United States Patent
DeGelis et al.

(10) Patent No.: US 8,438,707 B2
(45) Date of Patent: May 14, 2013

(54) FASTENER WITH RIBBED FLANGE

(75) Inventors: Vincent DeGelis, Grenoble (FR); Mathieu Cochard, La Tronche (FR)

(73) Assignee: A. Raymond et Cie, Grenoble (FR)

( * ) Notice: Subject to any disclaimer, the term of this patent is extended or adjusted under 35 U.S.C. 154(b) by 43 days.

(21) Appl. No.: 13/254,566

(22) PCT Filed: Apr. 10, 2010

(86) PCT No.: PCT/EP2010/002233
§ 371 (c)(1), (2), (4) Date: Sep. 2, 2011

(87) PCT Pub. No.: WO2010/121718
PCT Pub. Date: Oct. 28, 2010

(65) Prior Publication Data
US 2012/0131773 A1   May 31, 2012

(30) Foreign Application Priority Data
Apr. 20, 2009   (FR) ..................................... 09 52564

(51) Int. Cl.
*F16B 5/06* (2006.01)

(52) U.S. Cl.
USPC ............................................. 24/453; 24/297

(58) Field of Classification Search .................... 24/297, 24/453, 289, 292–295; 296/1.08, 39.1, 214, 296/146.7; 411/508–510; 403/408.1; 52/718.03, 52/718.06, 716.7
See application file for complete search history.

(56) References Cited

U.S. PATENT DOCUMENTS

| | | | |
|---|---|---|---|
| 6,305,055 B1 * | 10/2001 | Castro | ............................. 24/458 |
| 6,572,317 B2 | 6/2003 | Okada et al. | |
| 2005/0079033 A1 | 4/2005 | Benedetti et al. | |
| 2009/0022567 A1 | 1/2009 | Huet | |

FOREIGN PATENT DOCUMENTS

| | | |
|---|---|---|
| EP | 1895171 A2 | 3/2008 |
| FR | 2898164 A1 | 9/2007 |
| GB | 2236353 A | 4/1991 |

OTHER PUBLICATIONS

International Search Report and Written Opinion mailed Jun. 10, 2010 in related International Application No. PCT/EP2010/002233.

* cited by examiner

*Primary Examiner* — James Brittain
(74) *Attorney, Agent, or Firm* — Faegre Baker Daniels LLP

(57) ABSTRACT

A fastener is provided with a snap-fitting leg to be pushed through an opening of a panel, the snap-fitting leg including a flat rigid core which extends in an axial direction and at least one curved flexible flange having an inner longitudinal edge running alongside the core which is separated from a free outer longitudinal edge of the flange by a web with a concave inner surface. A stiffening rib is provided on the concave surface of the web of the flange. The rib connects to the free outer longitudinal edge of the flange at two remote points substantially aligned in the axial direction.

5 Claims, 1 Drawing Sheet

FASTENER WITH RIBBED FLANGE

CROSS-REFERENCE TO RELATED APPLICATION

This application is a U.S. National Phase Patent Application based on International Application Serial No. PCT/EP2010/002233 filed Apr. 10, 2010, the entire disclosure of which is hereby explicitly incorporated by reference herein.

BACKGROUND OF THE INVENTION

1. Field of the Invention

The present invention relates to a fastener provided with a snap-fitting leg to be pushed through an orifice of a panel.

2. Description of the Related Art

One known fastener is disclosed in GB-2236353. This known fastener comprises two flexible flanges defining a truncated shape which contributes to facilitating the insertion of the fastener in an orifice. However, this fastener can be easily dismounted due to the flexibility of the flanges.

A similar fastener in which a lateral cut is formed above the flanges to prevent the fastener from being easily extracted from the orifice in which it has been inserted is also known from document U.S. Pat. No. 6,572,317.

It is also known to increase the thickness of the flange web to stiffen and thus increase the mechanical hold of the fastener against tearing out. However, increasing the thickness of the flange web also has the effect of completely stiffening the flange and the deformation, necessary for mounting the fastener in the panel, is made more difficult.

The purpose of the invention is to propose another fastener such as defined above which is adapted to deform enough to be easily inserted in a panel orifice but which offers increased resistance to dismounting.

SUMMARY OF THE INVENTION

The present invention provides a fastener having a snap-fitting leg to be pushed through an orifice of a panel, the snap-fitting leg including a flat rigid core which extends along an axial direction and at least one curved flexible flange having an inner longitudinal edge bordering the core separated from a free outer longitudinal edge of the flange by a web having a concave inner surface. On the concave surface of the web, a stiffening rib is provided which connects to the free outer longitudinal edge of the flange in two remote points substantially aligned along said axial direction.

The invention more particularly relates to a fastener to fasten elements on a panel, for example to fasten a decorative element, such as a decorative panel, on a vehicle door. Thus, the fastener is first force-fitted, by deformation of the flexible flange, in an opening adapted to receive it and positioned in the decorative element, then is inserted in an orifice (of the cylindrical type, for example), formed within the door so as to fasten the decorative element on the door. By way of example, there can be a dozen fasteners per door, it is therefore important that mounting the fastener on the door be fast and easy. At the same time, the fastener must firmly connect the element on the door and resist any inopportune dismounting or tearing out.

This arrangement contributes, during the insertion of the fastener in an orifice, to the flange being forced to pivot (and therefore to disappear) about the axial direction by bending itself against the core of the edge, the flange returning to a deployed position after the passage through the orifice. Now, if one is looking to remove the fastener from the orifice, the disposition of the rib prevents the deformation of the flange by acting as a brace, which means that the rib supports the upper edge of the flange and resists its deformation, which reinforces the hold of the fastener against tearing out.

This arrangement of the rib thus contributes to easily mount the fastener and makes it difficult to dismount the fastener from a panel.

A fastener according to the invention can advantageously have the following characteristics:

the free outer longitudinal edge of the flange, as seen by an observer viewing the core transversely, has a V shape whose tip cuts an inflection plane of the flange and said rib, as seen by said observer, has the shape of a V whose tip cuts said inflection plane of the flange and is symmetrical to the V shape of the free outer longitudinal edge of the flange, the free outer longitudinal edge of the flange forming with the rib a cell having a diamond-shaped opening;

the core has a recession opposite the rib;

the fastener comprises two flanges arranged on both sides of the core, symmetrically with respect to the axial direction of the core; and the core and each flange provided with a rib are made of one piece by molding of a plastic material.

In one form thereof, a fastener is provided with a snap-fitting leg to be pushed through an orifice of a panel, said snap-fitting leg comprising a flat rigid core which extends along an axial direction and at least one curved flexible flange having an inner longitudinal edge running alongside the core separated from a free outer longitudinal edge of the flange by a web with a concave inner surface, characterized in that, on the concave inner surface of the web, a stiffening rib which connects to the outer longitudinal edge of the flange in two remote points substantially aligned along said axial direction is provided.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
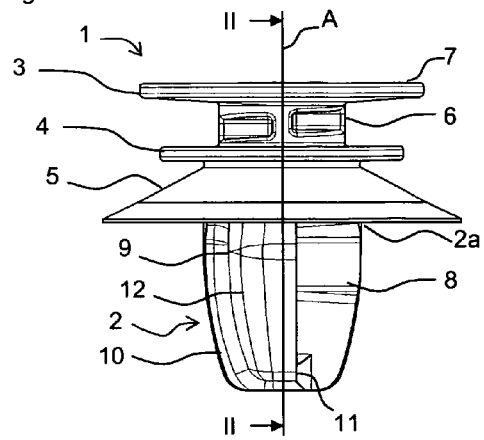
FIG. 1 is a side view in a plane of a fastener according to the invention.

Corresponding reference characters indicate corresponding parts throughout the several views. Although the exemplifications set out herein illustrate an embodiment of the invention, the embodiment disclosed below is not intended to be exhaustive or to be construed as limiting the scope of the invention to the precise form disclosed.

DETAILED DESCRIPTION

FIG. 1 shows a fastener 1 according to the invention extending along a longitudinal direction A and comprising a snap-fitting leg 2, also referred to as "anchor", adapted to be pushed and snap-fitted through an orifice of a panel not shown and connected to a head 3 by means of a connection zone 4 onto which is fixed an umbrella 5 constituting a deformable zone adapted to take support against the panel as is already known.

The head 3 is adapted to tightly fasten an element on the panel (not shown).

It is here presented in the form of a circular lug 6 topped by a cap 7 here in the form of a disc and adapted to be inserted in an opening formed in the element to be fastened. The head 3 can also be in the form of any other fastening system, for example a fastening system of the tube-support type or of the connector fastening type, or even a device for wrapping a wire bundle.

The connection zone 4, also referred to as the top of the snap-fitting leg 2, is here in the shape of a disc whose periphery has a variable shape, adapted to the element to be fastened, for example, oval, circular, or other.

The umbrella 5 has a conical shape flaring out from the connection zone 4 along the direction of an upper end 2a of the snap-fitting leg 2. The umbrella 5 is flexible and collapses when an axial force is applied on the head 3, which allows for attaching the fastener on panels of different thicknesses. The umbrella 5 plays a role of imperviousness and is used in particular to protect against dust or any runoff.

The snap-fitting leg 2 comprises a flat, rigid core 8 which extends along the axial direction A and, here, has two curved, flexible flanges 9 which extend symmetrically with respect to the axial direction A so that the leg 2 is substantially symmetrical with respect to the axis A, which allows for the forces set in play for mounting the fastener to also be symmetrical.

Each flange 9 has an inner longitudinal edge 10 which borders the core 8 and which is separated from a free outer longitudinal edge 11 of the flange by a web 12 whose inner surface 15 oriented toward the core 8 is concave. This concave surface 15 has generally the shape of a quarter oval sphere.

Figure 2:
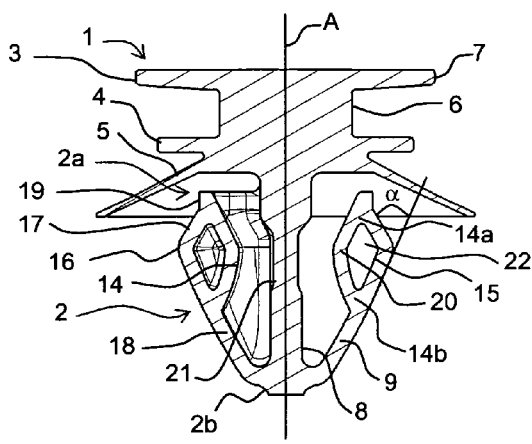
FIG. 2 is a cross-section view along the axis II-II of FIG. 1 of the fastener according to the invention.

FIG. 2 shows the fastener 1 in longitudinal cross-section along the axis II-II of FIG. 1. The flanges 9 give the leg 2 a general shape of two frustums of a cone connected at their base. The leg has an upper end 2a connected to the head 3 which is truncated whereas its free lower end 2b is tapered. More precisely, the free lower end 2b here is bullet-shaped, which allows for pre-centering the leg 2 in the orifice before the fastener 1 is inserted. This bullet shape of the free lower end 2b can be truncated, as can be seen in FIG. 2.

In addition, the free outer longitudinal edge 11 of each flange 9, as seen by an observer viewing the core 8 transversely (as indicated by the arrow D in FIG. 3), has the shape of a V whose tip is directed outwardly and forms an inflection plane 16 of the flange 9 (which corresponds to the common base of the two frustums of a cone), so as to define, for the fastener 1, a zone referred to as retaining zone 17 having a truncated shape, which starts from the upper end 2a of the leg 2 and moves away from the axis A up to the inflection plane 16 and a zone referred to as an insertion zone 18 which starts from the inflection plane 16, becoming closer to the axis A up to the lower end 2b of the leg 2.

The insertion zone 18 is larger than the retaining zone 17 and engages first in the orifice, the retaining zone 17 serving to block the fastener 1 in the orifice by resisting the tearing forces set in play as will be described below.

As seen in FIG. 2, a stiffening rib 14 is provided on the concave surface 15 of the web 12 for each flange 9. This rib 14 connects by its two ends 14a, 14b to the outer longitudinal edge 11 of the flange 9 in two remote points substantially aligned along the axial direction A. More particularly, the upper end 14a of the rib 14 connects to the edge 11 in the area of the retaining zone 17 and the lower end 14b of the rib 14 connects to the edge 11 in the area of the insertion zone 18.

The rib 14 somewhat plays a role of a brace opposing a deformation of the flange 9 and contributes, on the one hand, in helping the flange 9 to bend back against the core 8 during the insertion of the fastener 1 in the orifice while preventing the deformation of the flange 9 transverse to the axis A if an attempt is made to tear the fastener 1 away from the orifice.

Figure 4:
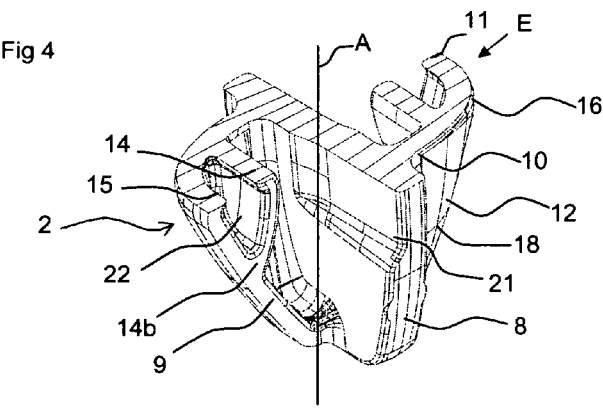
FIG. 4 is a partial, perspective view of the fastener according to the invention.

It is to be understood that the rib 14 somewhat doubles the web 12 in the area of the outer edge 11 of the flange and extends in depth parallel to the flat surface of the core 8 until it connects over its length to the concave surface 15 of the web 12 (as shown in FIG. 4).

The rib 14 can be rectilinear or semi-circular. But preferably, the rib 14, as seen by an observer viewing the core 8 transversely (as shown by the arrow D in FIG. 3), has the shape of a V whose tip 20 is directed toward the core 8 while being symmetrical to the V shape of the flange 9. As shown in FIG. 2, the V shape of the outer longitudinal edge 11 of the flange 9 and the V shape of the rib 14 here point in an opposite manner while being substantially aligned in the area of the inflection plane 16 of the flange 9 so as to define a hollow cell 22 having a diamond-shaped opening elongated in the direction A and whose bottom is constituted of the web 12. More precisely, this diamond shape is more elongated in the insertion zone 18 than in the retaining zone 17 of the flange 9.

The retaining zone 17 of the flange 9 is extended by a cylindrical zone or centering neck 19 which extends in direction A and whose purpose is to correctly position the fastener 1 in the orifice.

As visible in FIG. 2, a reinforcement 21 is formed in the flat lateral surface 8a of the core 8 which is on the side of the V-shaped rib 14 of the flange 9. This reinforcement 21 serves as housing to the rib 4 when the flange 9 is bent back against the core 8 during the insertion of the fastener 1. Naturally, for a fastener 1 with two flanges 9, a reinforcement 21 is provided on each lateral surface 8a of the core 8.

Figure 3:
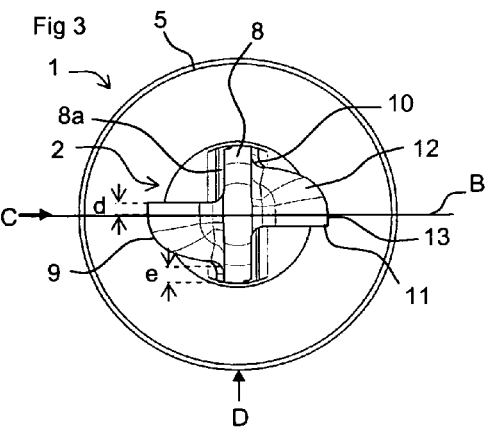
FIG. 3 shows the fastener according to the invention viewed from the bottom.

As can be better seen in FIG. 3 which represents the fastener 1 according to the invention seen from the bottom, that is, by looking in the direction of the snap-fitting leg 2, the flange 9 extends on a linear zone 13 beyond a symmetry axis B of the core 8 which separates the core 8 into two equal parts in the direction of its length 8a, so that the free outer longitudinal edge 11 extends further than the axis B by a distance indicated by "d". Due to the linear zone 13, the two flanges 9 have an overlapping zone about the axis B so as to enhance the contact between the flange 9 and the orifice in which the fastener 1 is inserted. In addition, when the fastener 1 is produced by molding, the linear zone 13 makes it possible to easily take the flange 9 out of the mold without imposing any constraint on the fastener 1.

As shown in FIG. 3, the inner longitudinal edge 10 of the flange 9 is connected to the lateral surface 8a of the core 8 distant from the edge of the core 8 indicated by "e" in FIG. 3, which allows for the core 8 to play a role in pre-guiding the fastener 1 in the orifice of the panel.

The outer longitudinal edge 11 of the flange 9, as seen by an observer viewing a surface 8a of the core 8 (as indicated by the arrow C in FIG. 2), is rectilinear and substantially perpendicular to the core 8.

FIG. 4 shows the leg 2 of the fastener 1 according to the invention, cut transversely right above the inflection plane 16 of the flange 9, so as to better show the cell 22.

The thickness of the flange 9 is constant over the entire flange 9, except for the upper 14a and lower 14b ends of the rib 14 where the latter connects to the flange 9 and where connecting spokes are formed so as to not create rupture zones on the flange 9.

A fastener 1 according to the invention generally has a diameter comprised between about 4 millimeters (mm) and 20 mm. The thickness of the flange 9 and that of the rib 14 can thus vary by 0.05 mm to 3 mm, while being preferably similar to one another. The umbrella 5 has a lesser thickness with respect to the thickness of the flange 9, comprised between about 0.3 and 0.8 mm. The distance "d" from which the free outer longitudinal edge 11 projects over the axis B can vary between about 1 and 2 mm. The bullet shape of the free lower end 2b can extend from about 0.5 mm to 1 mm.

Preferably, the core 8, each flange 9 with a rib 14 are made in one piece by molding a plastic material and it can also be provided to make the fastener 1 entirely in one piece by molding a plastic material. The chosen plastic material can be, for example, an injectable thermoplastic polymer which can be chosen from the following list: polyamide, polyethylene, polyoxymethylene, polypropylene, or any other adapted thermoplastic polymer.

To mount the fastener 1 according to the invention in an adapted orifice of a panel (not shown), that is, an orifice having a diameter substantially smaller than the circumference of the leg 2 of the fastener 1 in the area of the inflection plane 16 and substantially equal to the circumference of the leg 2 in the area of the centering neck 19, one only has to exert a pressure on the head 3 of the fastener 1 in the axial direction A. This axial pressure pushes on the insertion zone 18 which forces the flange 9 to bend or to fold toward the core 8 by pivoting around the inner longitudinal edge 10 of the flange 9 which thus plays the role of a hinge for the flange 9. The rib 14 of the flange 9 stiffens the flange 9 and thus prevents any deformation of the flange 9 in a radial direction E substantially perpendicular to the direction A indicated in FIG. 4. In particular, the angle α formed by the retaining zone 17 with respect to the insertion zone 18 remains constant. During this pressure, the rib 14 can be housed in the reinforcement 21 of the core 8.

Once inserted, the fastener 1 is blocked in the panel in a known manner between the umbrella 5 and the centering neck 19.

It is thus difficult to dismount the fastener 1 since the head 3 is removed from the fastener 1 in the direction A in the direction opposite the insertion direction, the rib 14 still opposing the deformation of the flange 9 toward the core 8 in the radial direction E. This time, the axial pressure rests on the retaining zone 17 of the flange 9 which, being shorter than the insertion zone 18, transmits less force to the flange 9 to pivot about the inner longitudinal edge 10 of the flange 9.

It will be understood that the V shape of the rib 14 is adapted to prevent an inopportune or involuntary dismounting of the fastener 1 while still making it possible, if a minimal force is applied onto the head 3 of the fastener 1, to possibly dismount the fastener 1 without breaking the fastener 1.

It is evident that the present invention is not limited to the preceding description of one embodiment, susceptible of being the object of several modifications without for that matter leaving the scope of the invention. For example, the fastener 1 can be adapted to be inserted in an oblong orifice. In this case, the core 8 can be split into two parts, thus creating two laterals posts spaced apart by a certain distance and on each of which is fastened a ribbed flange 9 as described above.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A fastener for use in being pushed through an orifice of a panel, said fastener comprising:
a snap-fitting leg including a flat rigid core extending along an axial direction and at least one curved flexible flange having an inner longitudinal edge extending alongside said core and separated from a free outer longitudinal edge of said flange by a web having a concave inner surface, and a stiffening rib provided on said concave inner surface of said web which connects to said outer longitudinal edge of said flange at a pair of spaced points substantially aligned along said axial direction.

2. The fastener of claim 1, wherein said free outer longitudinal edge of said flange, when viewed in a direction transverse to said core, has a V-shape with a tip forming an inflection plane of said flange, and said rib, when viewed in said transverse direction, has a V-shape with a tip aligned with said inflection plane and symmetrical to said V-shape of said free outer longitudinal edge of said flange, said free outer longitudinal edge of said flange forming with said rib a cell having a diamond-shaped opening.

3. The fastener of claim 1, wherein said core has a reinforcement opposite said rib.

4. The fastener of claim 1, further comprising two flanges arranged on both sides of said core symmetrically with respect to said axial direction of said core.

5. The fastener of claim 1, wherein said core and each said flange are made in one piece by molding a plastic material.

\* \* \* \* \*